US010168606B2

(12) United States Patent
Ogawa

(10) Patent No.: US 10,168,606 B2
(45) Date of Patent: Jan. 1, 2019

(54) LIGHT SOURCE UNIT AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/632,039

(22) Filed: Jun. 23, 2017

(65) Prior Publication Data
US 2018/0081263 A1  Mar. 22, 2018

(30) Foreign Application Priority Data

Sep. 16, 2016 (JP) .................................. 2016-182025

(51) Int. Cl.
| | | |
|---|---|---|
| *G03B 21/20* | (2006.01) | |
| *F21K 9/64* | (2016.01) | |
| *G02B 5/20* | (2006.01) | |
| *G02B 26/00* | (2006.01) | |
| *G03B 33/08* | (2006.01) | |
| *F21Y 115/30* | (2016.01) | |

(Continued)

(52) U.S. Cl.
CPC .............. *G03B 21/204* (2013.01); *F21K 9/64* (2016.08); *G02B 5/201* (2013.01); *G02B 26/008* (2013.01); *G03B 21/2053* (2013.01); *G03B 33/08* (2013.01); *F21Y 2115/10* (2016.08); *F21Y 2115/30* (2016.08); *G03B 21/008* (2013.01); *G03B 21/2066* (2013.01); *G03B 21/28* (2013.01)

(58) Field of Classification Search
CPC .................................................... G03B 21/20
See application file for complete search history.

(56) References Cited

U.S. PATENT DOCUMENTS

2010/0328625 A1\* 12/2010 Miyazaki ............. G02B 26/008
353/85
2015/0167299 A1   6/2015 Trubnikow et al.

FOREIGN PATENT DOCUMENTS

JP    2012128438 A    7/2012
JP    2015528983 A    10/2015
(Continued)

OTHER PUBLICATIONS

Japanese Office Action (and English language translation thereof) dated Jun. 21, 2018 issued in counterpart Japanese Application No. 2016-182025.

*Primary Examiner* — Sultan Chowdhury
*Assistant Examiner* — Danell L Owens
(74) *Attorney, Agent, or Firm* — Holtz, Holtz & Volek PC

(57) ABSTRACT

A light source unit includes a first light source for emitting light in a first wavelength range, a luminescent wheel including a second light source for emitting light in a second wavelength range and a third light source for emitting light in a third wavelength range whose wavelength differs from that of the light in the second wavelength range, which are disposed circumferentially end to end in an adjacent fashion, a fourth light source for emitting light in a fourth wavelength range similar in color system to the light in the second or third wavelength range, and a control unit for controlling the fourth light source and the luminescent wheel to illuminate the fourth light source during a first color mixing period when a boundary between the second and third light sources is situated on an optical path of the light in the first wavelength range.

19 Claims, 10 Drawing Sheets

(51) Int. Cl.
  *F21Y 115/10* (2016.01)
  *G03B 21/00* (2006.01)
  *G03B 21/28* (2006.01)

(56) References Cited

FOREIGN PATENT DOCUMENTS

JP  2015222299 A  12/2015
JP  2016081819 A  5/2016

* cited by examiner

LIGHT SOURCE UNIT AND PROJECTOR

CROSS-REFERENCE TO RELATED APPLICATION

This application is based upon and claims the benefit of priority under 35 USC 119 from Japanese Patent Application No. 2016-182025 filed on Sep. 16, 2016, the contents of which, including the specification, claims, drawings and abstract, are incorporated herein by reference.

BACKGROUND OF THE INVENTION

Field of the Invention

The present invention relates to a light source unit and a projector including this light source unit.

Description of the Related Art

In these days, data projectors are used on many occasions as image projection systems which project a screen of a personal computer or a screen of video equipment, as well as images based on image data stored on a memory card onto a screen. These projectors are such that light emitted from a light source is collected onto a micromirror display device called a digital micromirror device (DMD) or a liquid crystal panel, so that a color image is projected onto a screen for display thereon.

Conventionally, in the mainstream of these projectors, high-intensity discharge lamps have been used as a light source. In recent years, however, various types of projectors have been developed which use, as a light source, light emitting diodes, laser diodes, organic electroluminescence, or luminescent material.

Japanese Unexamined Patent Publication No. 2015-222299 discloses a projector having an excitation light source, a luminescent plate on which a luminescent material layer is provided, and a diffusing plate on which a plurality of diffusing zones having different diffusing angles are provided. The luminescent plate is a luminescent wheel and includes a zone which transmits or diffuse transmits excitation light from the excitation light source. This prevents the reduction of utilization efficiency of excitation light and allows excitation light to be diffuse transmitted at an appropriate diffusing angle even when the brightness of excitation light is adjusted to deal with a number of projection modes.

In addition, a projector disclosed by Japanese Unexamined Patent Publication No. 2012-128438 includes a first light source which emits laser light in the blue wavelength range, a color wheel, and a second light source which emits light in the red wavelength range. A luminescent material layer which emits light in the green wavelength range when receiving laser light as excitation light and a diffusing layer which diffuse transmits laser beam are provided end to end on the color wheel. A light source unit generates light source light in which light in the green wavelength range generated as a result of light in the blue wavelength range being emitted from the first light source and light in the red wavelength range from the second light source are mixed by partially overlapping a period during which light in the green wavelength range is emitted as a result of light in the blue wavelength range being emitted from the first light source and a period during which light in the red wavelength range is emitted from the second light source. This enables the light source unit of Japanese Unexamined Patent Publication No. 2015-222299 to deal with a desired color environment in relation to color balance, the brightness of a projected image and the like at all times.

In the projector disclosed by Japanese Unexamined Patent Publication No. 2015-222299 described above, the luminescent material layer and the zone which transmits or diffuse transmits excitation light are provided continuously in a circumferential direction on the luminescent plate. When the light source unit emits light in the blue wavelength range, the light in the blue wavelength range is incident on the zone where it is transmitted or diffuse transmitted, and when the light source unit emits light in the green wavelength range, the light in the green wavelength range is shone on to the luminescent material layer on the luminescent plate. Additionally, when a boundary portion between the zone where excitation light is transmitted or diffuse transmitted and the luminescent material layer is situated on an optical path of excitation light, the excitation light source does not emit excitation light. Due to this, in the projector disclosed by Japanese Unexamined Patent Publication No. 2015-222299, a period exists during which no light is emitted, resulting in a case where a projected image cannot be illuminated sufficiently.

In general, luminosity factors differ from wavelength to wavelength. For example, the luminosity factor of light in the red wavelength range is relatively lower than those of light in other wavelength ranges of colors. Consequently, in the case where it is desired that a highly bright image is projected by the use of the projector disclosed by Japanese Unexamined Patent Publication No. 2012-128438, it is necessary to enlarge the size and output of the red light source greater than those of the blue light source and the green light source which emit blue light and green light both having higher luminosity factors than that of red light to increase the luminance of the red light source. However, when the size and output of the light source which emits light having the lower luminosity factor are enlarged, there may be caused fears that the arrangement of constituent optical parts becomes inefficient or the luminous efficiency of the light source is lowered due to the heat value thereof being increased. In addition, in the case where the luminance of a wavelength component of the light source light which has a low luminosity factor is low, the extent to which the brightness and color balance of a projected image is adjusted becomes narrow.

SUMMARY OF THE INVENTION

The invention has been made in view of the situations described above, and an object thereof is to provide a light source unit which can adjust the brightness and color balance of an image generated to a wide extent and a projector which includes this light source unit.

According to an aspect of the invention, there is provided a light source unit having:

a first light source for emitting light in a first wavelength range;

a luminescent wheel device comprising a luminescent wheel including a second light source for emitting light in a second wavelength range which is luminous light excited by the light in the first wavelength range and a third light source for emitting light in a third wavelength range which is luminous light excited by the light in the first wavelength range and whose wavelength differs from a wavelength of the light in the second wavelength range, the second light source and the third light source being disposed end to end in an adjacent fashion in a circumferential direction;

a fourth light source for emitting light in a fourth wavelength range which is of the same color system as the light in the second wavelength range or which is of the same color system as the light in the third wavelength range; and a control unit for controlling the fourth light source and the luminescent wheel device so that the fourth light source is illuminated during a first color mixing period during which a boundary between the second light source and the third light source is situated on an optical path of the light in the first wavelength range.

According to another aspect of the invention, there is provided a projector having:

the light source unit described above;

a display device on to which light source light is shone from the light source unit to thereby form image light;

a projection-side optical system for projecting the image light emitted from the display device on to a screen; and the control unit for controlling the display device and the light source unit.

DETAILED DESCRIPTION OF THE PREFERRED EMBODIMENTS

Figure 1:
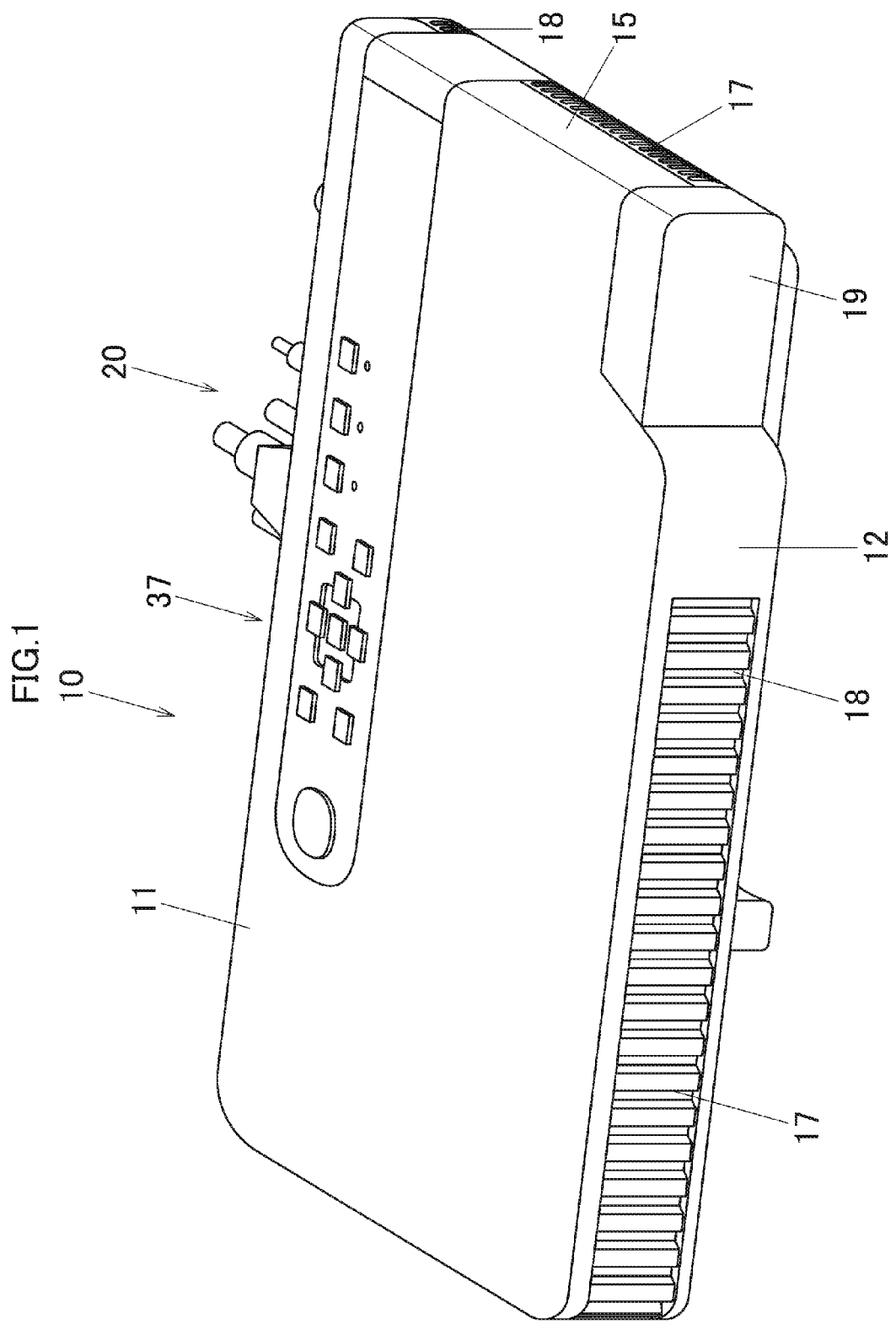
FIG. 1 is an external perspective view showing a projector according to a first embodiment of the invention.

Referring to the drawings, embodiments will be described in which the invention is applied to a projector of a DLP (a registered trademark) (Digital Light Processing) system.
(First Embodiment)

Hereinafter, a first embodiment of the invention will be described. FIG. 1 is an external perspective view of a projector 10 according to this embodiment. In this embodiment, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As is shown in FIG. 1, the projector 10 has a virtually rectangular parallelepiped shape and has a lens cover 19 for covering a projection port at an end of a front panel 12 which makes up a front panel of a casing of the projector 10. Pluralities of outside air inlet holes 18 and inside air outlet holes 17 are provided in the front panel 12. Further, although not shown, the projector 10 includes an IR reception unit which receives a control signal from a remote controller.

In addition, a keys/indicators unit 37 is provided on an upper panel 11 of the casing. Disposed on this keys/indicators unit 37 are keys and indicators which include a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, a control circuit or the like when they really overheat.

Further, various types of terminals 20 including an input/output connector unit, a power supply adaptor plug and the like are provided on a back panel of the casing. The input/output connector unit includes a USB terminal, a video signal input D-SUB terminal, an S terminal, an RCA terminal and the like. Additionally, a plurality of outside air inlet holes are formed in the back panel. A plurality of inside air outlet holes 17 are formed in each of a right panel, not shown, which is a side panel of the casing and a left panel 15 which is a side panel shown in FIG. 1. A plurality of outside air inlet holes 18 are formed in a corner portion between the left panel 15 and the back panel.

Figure 2:
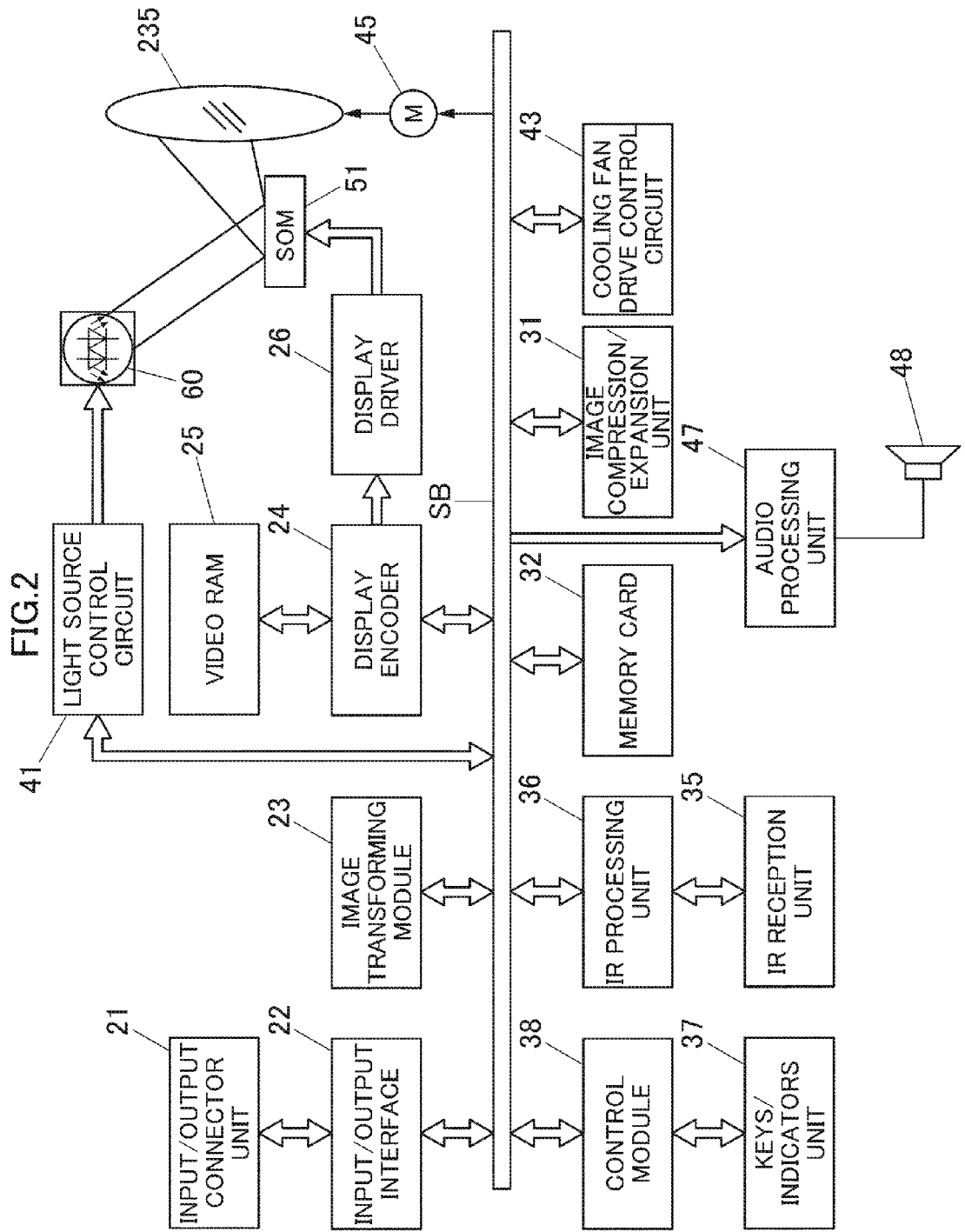
FIG. 2 is a block diagram showing functional circuitry blocks of the projector according to the first embodiment of the invention.

Next, a projector control unit of the projector 10 will be described by the use of a block diagram of functional circuitry blocks shown in FIG. 2. The projector control unit includes a control module 38, an input/output interface 22, an image transforming module 23, a display encoder 24, a display driver 26 and the like. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate in response to the image signal outputted from the display encoder 24. The projector 10 shines a pencil of light which is emitted from a light source unit 60 on to the display device 51 by way of a light guiding optical system, whereby an optical image is formed by using reflected light which is reflected by the display device 51. The image so formed is then projected on to a screen, not shown, for display thereon by way of a projection-side optical system. In addition, a movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion unit 31 reads out the image data recorded on the memory card 32 and expands the individual image data which make up a series of dynamic images frame by frame. Then, the image compression/expansion unit 31 outputs the image data to the display encoder 24 by way of the image transforming module 23 so as to enable the display of dynamic images based on the image data stored on the memory card 32.

The control module 38 governs the control of operations on circuitries within the projector 10 and includes a ROM which stores operation programs of a CPU and various settings in a fixed fashion and a RAM which is used as a working memory.

Then, operation signals generated at the keys/indicators unit 37 which includes the main keys and indicators which are provided on the upper panel 11 are sent out directly to the control module 38. Key operation signals from the remote controller are received by the IR reception unit 35, and a code signal demodulated at an IR processing unit 36 is outputted to the control module 38.

The control module 38 is connected to an audio processing unit 47 by way of the system bus (SB). This audio processing unit 47 includes a circuitry for a sound source such as a PCM sound source. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls separately the operation of an excitation light shining device 70 (refer to FIG. 3) of the light source unit 60 so that light in specified wavelength ranges which are required in producing an image is emitted from the light source unit 60. In addition, the light source control circuit 41 controls a timing at which a luminescent wheel 101 and the like are synchronized according to a projection mode based on an instruction from the control module 38. In this embodiment, the projector 10 includes a brightness prioritizing mode and a color prioritizing mode. The brightness prioritizing mode is a mode for projecting a bright image on to a screen. The color prioritizing mode is a mode for projecting an image having high color purity on to the screen.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating by use of a timer even after the power supply to the main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
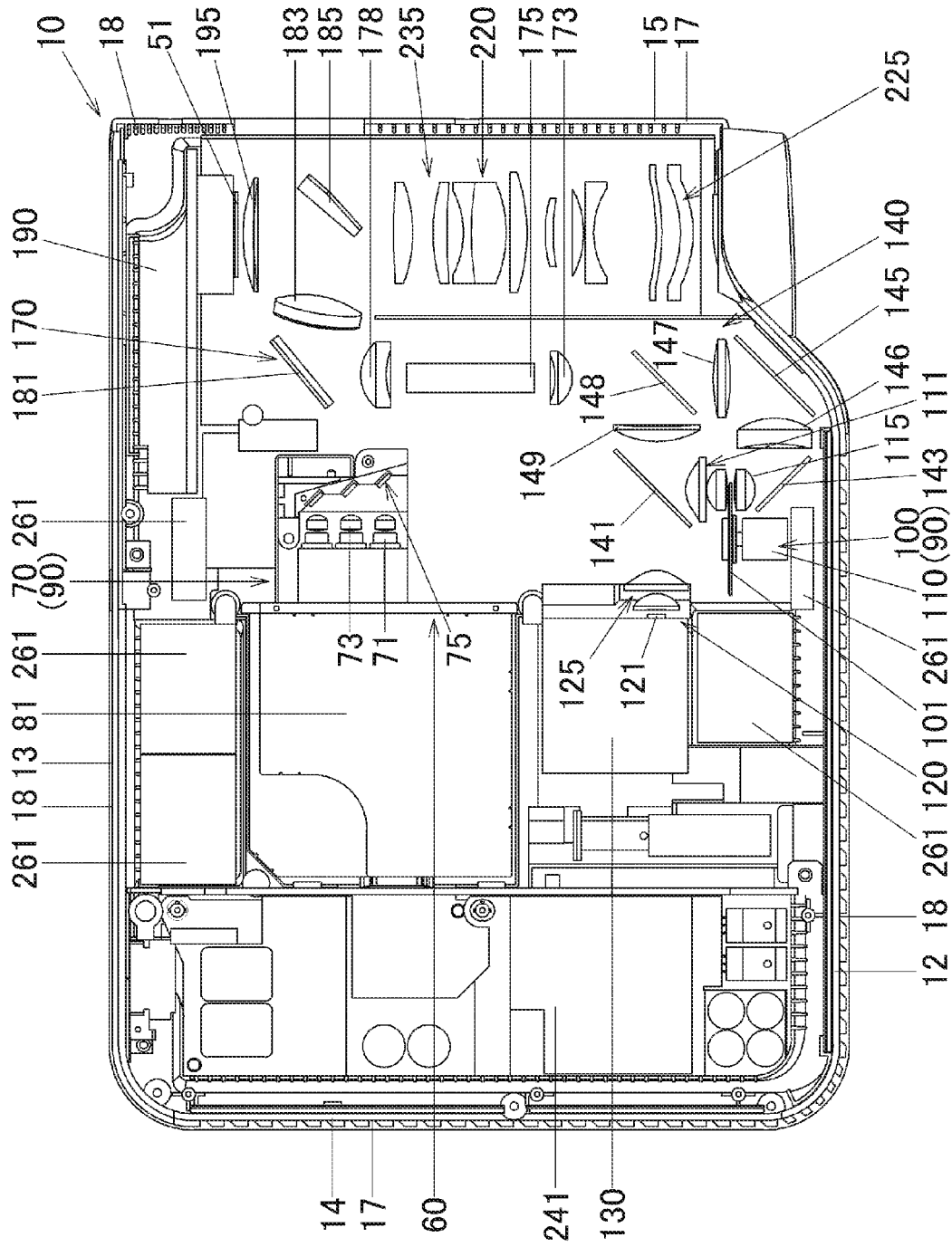
FIG. 3 is a schematic plan view showing an internal construction of the projector according to the first embodiment of the invention.

FIG. 3 is a schematic plan view showing an internal construction of the projector 10. The projector 10 includes a control circuit board 241 near the right panel 14. This control circuit board 241 includes a power supply circuit block and a light source control block. In addition, the projector 10 includes the light source unit 60 which is disposed to a side of the control circuit board 241, that is, in a virtually central portion of the casing. Further, in the projector 10, a light source-side optical system 170 and a projection-side optical system 220 are disposed between the light source unit 60 and the left panel 15.

The light source unit 60 includes the excitation light shining device 70 which functions not only as a light source of light in a blue wavelength range (light in a first wavelength range) but also as an excitation light source, a luminous light source device 90 which functions as a light source of light in a red wavelength range (light in a third wavelength range) and light in a green wavelength range (light in a second wavelength range), and a red light source device 120 which functions as a light source of light in a different red wavelength range. The luminous light source device 90 is made up of the excitation light shining device 70 and a luminescent wheel device 100. Then, the light source unit 60 includes a light guiding optical system 140 which guides and emits the light in the red, green and blue wavelength ranges. The light guiding optical system 140 guides the light in the blue wavelength range emitted from the excitation light shining device 70, the light in the green wavelength range emitted from the luminous light source 90 and the light in the red wavelength range emitted from the red light source device 120 to the light source-side optical system 170.

The excitation light shining device 70 is disposed substantially at the center of the casing of the projector 10 in relation to a left-right or transverse direction thereof and near the back panel 13. Then, the excitation light shining device 70 includes a group of light sources which is made up of blue laser diodes (a first light source, a first light emitting device) 71 which are a plurality of semiconductor light emitting elements which are disposed so that optical axes thereof are parallel to the back panel 13, a group of reflection mirrors 75 configured to change axes of rays of light emitted from the corresponding blue laser diodes 71 through 90 degrees towards the front panel 12, and a heat sink 81 which is disposed between the blue laser diodes 71 and the right panel 14.

The light source group is made up of the plurality of blue laser diodes 71 which are arranged into a matrix configuration. In this embodiment, an up-down or vertical direction in FIG. 3 is referred to as a row, and a direction normal to a surface of a piece of paper on which FIG. 3 is drawn is referred to as a column. Then, when looking at the matrix of blue laser diodes 71 sideways from the left panel, a total of six laser diodes 71 are arranged into the matrix configuration of two rows by three columns. In addition to the matrix configuration of six blue laser diodes described above, a total of five blue laser diodes 71 can be provided by arranging four laser diodes 71 into two rows by two columns and one blue laser diode 71 is disposed in a center of the configuration of two rows by two columns.

A plurality of collimator lenses 73 are disposed on optical axes of the blue laser diodes 71, and these collimator lenses 73 convert light emitted from the corresponding blue laser diodes 71 into parallel light so as to enhance the directivity of the emitted light. The reflecting mirror group 75 is made up of a plurality of reflecting mirrors which are arranged into a stair and are integrated with a substrate. The reflecting mirrors 75 narrow pencils of light emitted from the corresponding blue laser diodes 71 in one direction and emit the pencils of light towards a first dichroic mirror 141.

A cooling fan 261 is disposed between the heat sink 81 and the back panel 13, and the blue laser diodes 71 are cooled by this cooling fan 261 and the heat sink 81. Further, a cooling fan 261 is also disposed between the reflecting mirror group 75 and the back panel 13, and the reflecting mirror group 75 is cooled by this cooling fan 261.

The luminescent wheel device 100 which makes up the luminous light source 90 is disposed on an optical path of excitation light emitted from the excitation light shining device 70 and near the front panel 12. The luminescent wheel device 100 includes a luminescent wheel 101, a motor 110, a collective lens group 111, and a collective lens 115. The luminescent wheel 101 is disposed so as to be substantially parallel to the front panel 12, that is, so as to be at right angles to an axis of light emitted from the excitation light shining device 70. The motor 110 drives the luminescent wheel 101 rotationally. The collective lens group 111 collects a pencil of excitation light emitted from the excitation light shining device 70 to the luminescent wheel 101 and collects a pencil of light emitted from the luminescent wheel 101 in the direction of the back panel 13. The collective lens 115 collects a pencil of light emitted from the luminescent wheel 101 in the direction of the front panel 12. A cooling fan 261 is provided on a side of the motor 110 which faces the front panel 12, and the luminescent wheel device 100 is cooled by this cooling fan 261.

Figure 4:
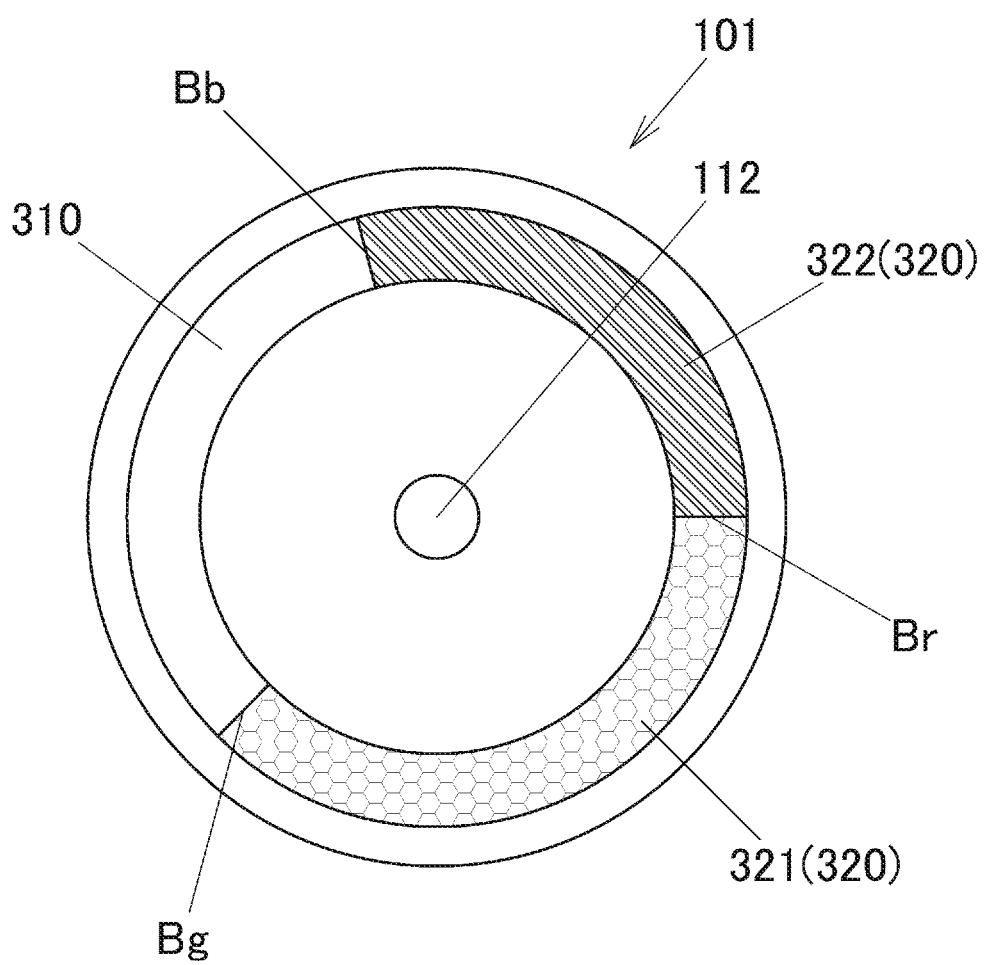
FIG. 4 is a schematic front view of a luminescent wheel according to the first embodiment of the invention.

Here, the luminescent wheel 101 will be described. FIG. 4 is a schematic front view of the luminescent wheel 101. The luminescent wheel 101 has the shape of a substantially circular disk and is fixed to a shaft portion 112 of the motor 110 at a central portion thereof. A base material of the luminescent wheel 101 is a metallic material of copper or aluminum, and a front surface of the base material which faces the excitation light shining device 70 is mirror finished through silver deposition or the like. A transmitting segment 310 and a luminescent segment 320 are provided end to end in a circumferential direction near an outer circumferential edge of the luminescent wheel 101. The luminescent segment 320 is formed on the mirror finished front surface of the luminescent wheel 101. In addition, the luminescent segment 320 includes a green luminescent material body 321, which constitutes a second light source, and a red luminescent material body (a third light emitting device) 322, which constitutes a third light source, and the green luminescent material body 321 and the red luminescent material body 322 are disposed end to end in the circumferential direction.

The transmitting segment 310 is formed, for example, by fitting a transparent material having a light transmission property in a cutout portion which is formed in an outer circumferential portion of the base material of the luminescent wheel 101. The transmitting segment 310 diffuse transmits light shone on thereto from a front side towards a rear side of the luminescent wheel 101. When light in the blue wavelength range emitted from the excitation light shining device 70 is shone on thereto, the green luminescent material body 321 emits light in the green wavelength range (light in a second wavelength range) as luminous light. In addition, when light in the blue wavelength range emitted from the excitation light shining device 70 is shone on thereto, the red luminescent material body 322 emits light in the red wavelength range (light in a third wavelength range) as luminous light.

Returning to FIG. 3, the red light source device 120 includes a red light source (a fourth light source, a fourth light emitting device) which is disposed so that an optical axis thereof becomes parallel to the blue laser diodes 71, and a collective lens group 125 which collects light emitted from the red light source 121. This red light source 121 is a red light emitting diode which is a semiconductor light emitting device which emits light in the red wavelength range (light in a fourth wavelength range). Then, the red light source device 120 is disposed so that an axis of light in the red wavelength range which is emitted from the red light source device 120 intersects an axis of light in the green wavelength range which is emitted from the luminescent wheel 101. Additionally, the red light source device 120 includes a heat sink 130 which is disposed on a side of the red light source 121 which faces the right panel 14. Then, a cooling fan 261 is disposed between the heat sink 130 and the front panel 12. Thus, the red light source 121 is cooled by the cooling fan 261 and the heat sink 130.

The light guiding optical system 140 is made up of collective lenses which collect pencils of light in the red, green and blue wavelength ranges, reflecting mirrors and dichroic mirrors which change axes of pencils of light in the red, green and blue wavelength ranges so that the axes are aligned in the same direction. Hereinafter, those members will be described individually.

Figure 5:
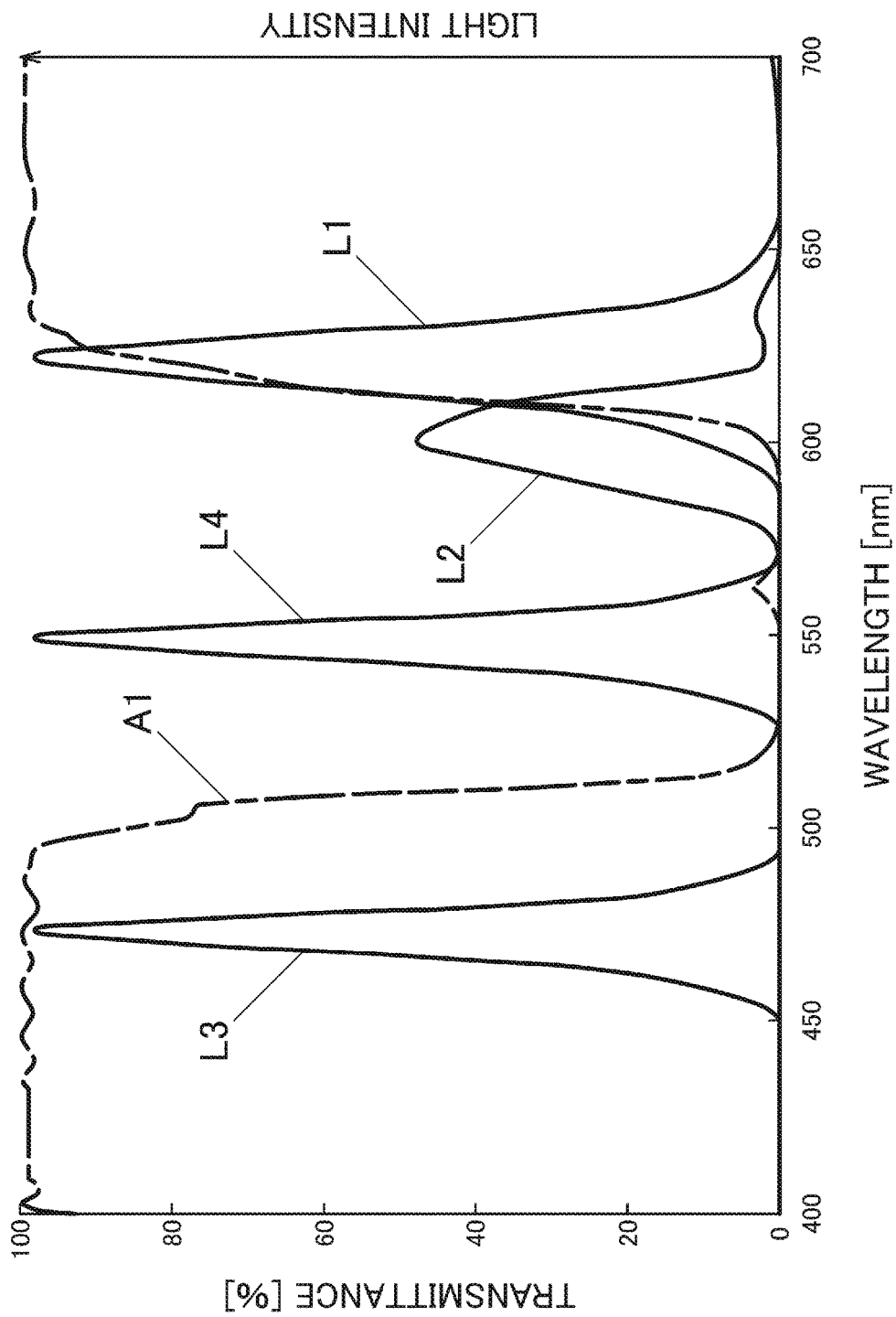
FIG. 5 is a spectral distribution chart of a first dichroic mirror according to the first embodiment of the invention.

The first dichroic mirror 141 is disposed between the reflecting mirror group 75 and the collective lens group 111. FIG. 5 is a spectral distribution chart of the first dichroic mirror 141. A first axis of ordinate on the left denotes transmittance [%], and a second axis of ordinate on the right denotes light intensity. An axis of abscissa denotes a wavelength [nm] of light. FIG. 5 shows a distribution curve of light in the red wavelength range L1 which is emitted from the red light source 121, a distribution curve of light in the red wavelength range L2 which is emitted from the red luminescent material 322, and a transmission property A1 of the first dichroic mirror 141.

The light in the red wavelength range L1 is light whose wavelength range is in the range of about 600 nm to 650 nm and whose peak wavelength is about 620 nm. The light in the red wavelength range L2 is light whose wavelength range is in the range of about 580 nm to about 620 nm and whose peak wavelength is about 600 nm. Thus, the wavelength of the light in the red wavelength range L1 is longer than the wavelength of the light in the red wavelength range L2. Additionally, the intensity of the light in the red wavelength range L1 is more intense than the intensity of the light in the red wavelength range L2.

The transmission property A1 of the first dichroic mirror 141 is such that in a range shown of 400 nm to 700 nm, light in a wavelength range of up to about 510 nm is transmitted, and light in a range of about 510 nm to about 610 nm is reflected. In addition, the first dichroic mirror 141 transmits light in a wavelength range of about 610 nm and longer. Consequently, the first dichroic mirror 141 transits most of light in a blue wavelength range of about 450 nm to about 490 nm whose peak wavelength is about 470 nm and reflects most of light in a green wavelength range of about 530 nm to about 570 nm whose peak wavelength is about 550 nm and part of light in the red wavelength range which is distributed on a short wavelength side of the red wavelength range.

According to the transmission property A1 of the first dichroic mirror 141, the first dichroic mirror 141 transmits the light in the red wavelength range L1 which is emitted from the red light source 121 and reflects the light in the red wavelength range L2 which is emitted from the red luminescent material 322, whereby the light in the red wavelength range L1 and the light in the red wavelength range L2 which are in the same color system can be aligned into a single pencil of light which travels on the same optical path.

Returning to FIG. 3, the light in the green wavelength range and the combined light in the red wavelength range which are reflected by the first dichroic mirror 141 are emitted in the direction of the left panel 15.

A first reflecting mirror 143 is disposed on an axis of light in the blue wavelength range which is transmitted or diffuse transmitted through the luminescent wheel 101, that is, between the collective lens 115 and the front panel 12. The first reflecting mirror 143 reflects the light in the blue wavelength range to change the direction of the axis thereof through 90 degrees in the direction of the left panel 15. A collective lens 146 is disposed on a side of the first reflecting mirror 143 which faces the left panel 15, and further, a second reflecting mirror 145 is disposed on a side of the collective lens 146 which faces the left panel 15. The second reflecting mirror 145 changes the direction of the axis of the light in the blue wavelength range which is incident thereon from the collective lens 146 through 90 degrees in the direction of the back panel 13.

A collective lens 147 is disposed on a side of the second reflecting mirror 145 which faces the back panel 13. Additionally, a second dichroic mirror 148 is disposed on a side of a collective lens 149 which faces the left panel 15 and a side of the collective lens 147 which faces the back panel 13. The second dichroic mirror 148 reflects light in the green wavelength range and light in the red wavelength range to change the directions of axes of the green light and the red light through 90 degrees in the direction of the back panel 13 and transmits light in the blue wavelength range. Light in the blue wavelength range collected by the collective lens 147 passes through the second dichroic mirror 148 and is then collected to a collective lens 173 of the light source-side optical system 170.

On the other hand, the collective lens 149 is disposed on a side of the first dichroic mirror 141 which faces the left panel 15. The axes of the light in the green wavelength range and the light in the red wavelength range which are reflected by the first dichroic mirror 141 are incident on the collective lens 149. The light in the green wavelength range and the light in the red wavelength range which are collected by the collective lens 149 are reflected by the second dichroic mirror 148 and are then collected to the collective lens 173 of the light source-side optical system 170. In this way, the light in the blue wavelength range, the light in the green wavelength range and the light in the red wavelength range are guided to the light source-side optical system 170.

The light source-side optical system 170 is made up of the collective lens 173, a light tunnel 175, a collective lens 178, a light axis changing mirror 181, a collective lens 183, a shining mirror 185, and a condenser lens 195. Since the condenser lens 195 emits image light emitted from the display device 151 which is disposed on a side of the condenser lens 195 which faces the back panel 13 towards the projection-side optical system 220, the condenser lens 195 also makes up part of the projection-side optical system 220.

The collective lens 173 is disposed near an entrance or incident port of the light tunnel 175 to collect light source light. Rays of light in the red, green and blue wavelength ranges which are collected by the collective lens are emitted therefrom towards the light tunnel 175.

The light axis changing mirror 181 is disposed on an optical axis of the light tunnel 175 which extends from an end thereof which faces the back panel 13 and to the rear of the collective lens 178. A pencil of light emitted from an exit port of the light tunnel 175 is collected by the collective lens 178, whereafter the axis of the pencil of light so collected is changed towards the left panel 15 by the light axis changing mirror 181.

The pencil of light reflected by the light axis changing mirror 181 is collected by the collective lens 183 to thereafter be shone on to the display device 51 at a predetermined angle by way of the condenser lens 195 by the shining mirror 185. The display device 51, which is a DMD, has a heat sink 190 which is provided on a side thereof which faces the back panel 13, and the display device 51 is cooled by this heat sink 190.

The pencil of light which is the light source light which is shone on to an image forming plane of the display device 51 by the light source-side optical system 170 is reflected on the image forming plane of the display device 51 and is projected on to a screen byway of the projection-side optical system 220 as projected light. Here, the projection-side optical system 220 is made up of the condenser lens 195, the movable lens group 235 and a fixed lens group 225. The movable lens group 235 is configured so as to be moved by the lens motor. Then, the movable lens group 235 and the fixed lens group 225 are incorporated in a fixed lens barrel. Thus, the fixed lens barrel including the movable lens group 235 is configured as a variable-focus lens which enables zooming and focusing.

By configuring the projector 10 in the way described heretofore, when the luminescent wheel 101 is rotated and light is emitted at appropriate timings from the excitation light shining device 70 and the red light source device 120, light in the blue wavelength range, light in the green wavelength range and light in the red wavelength range are incident on the display device 51 by way of the light guiding optical system 140 and the light source-side optical system 170. Due to this, the DMD, which is the display device 51, of the projector 10 displays light in the red, green and blue wavelength ranges in a time sharing fashion according to data, whereby a color image can be projected on to the screen.

Figure 6:
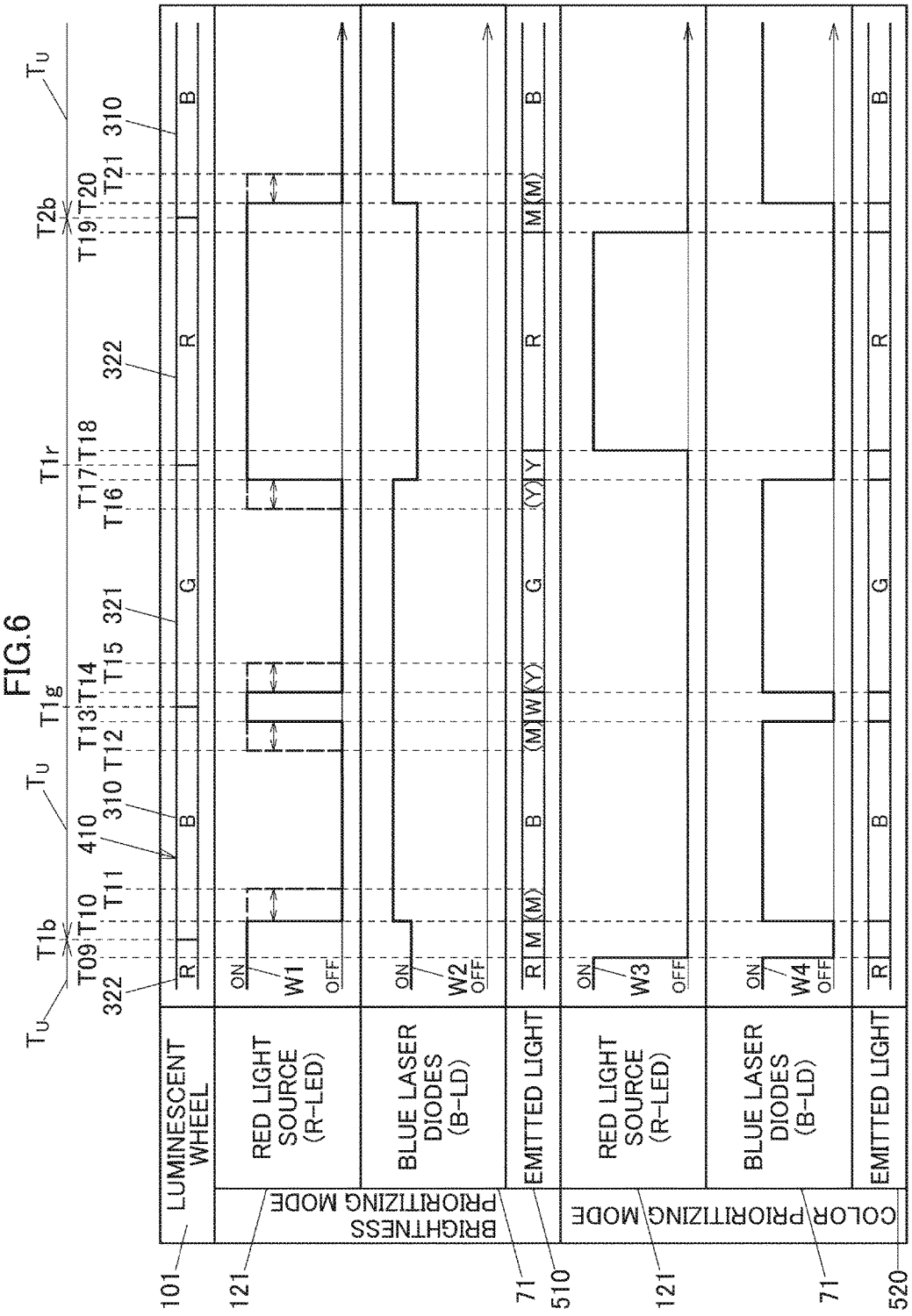
FIG. 6 is a timing chart of a light source unit according to the first embodiment of the invention.

FIG. 6 is a timing chart of the light source unit 60. This timing chart shows a relation between the position 410 of the luminescent wheel 101 and light emitting timings of the red light source (R-LED) 121 and the blue laser diodes (B-LD) 71 in a brightness prioritizing mode and a color prioritizing mode. Emitted light 510 and emitted light 520 show which color of light is emitted at which timing. The shining position 410 of the luminescent wheel 101 shows a position on the luminescent wheel 101 on to which light in the blue wavelength range is shone when it is emitted from the blue laser diodes 71. Operations of the light source unit 60 shown in this timing chart are controlled by the control module 38.

Firstly, the brightness prioritizing mode will be described. The projector 10 forms an image frame in a unit period TU which is a time period from a timing T1$b$ to a timing T2$b$. The unit period TU is repeated through time sharing. A waveform W1 indicates an output state of the red light source 121 in the brightness prioritizing mode. In addition, a waveform W2 indicates an output state of the blue laser diodes 71 in the brightness prioritizing mode.

In the brightness prioritizing mode, the red light source 121 emits light in the red wavelength range during a time period which continues from the previous unit period to a timing T10, a time period between timings T13 and T14, and a time period between timings T17 to T20. The red light source 121 emits light in the red wavelength range continuously from the previous unit time TU and to the following unit time TU at a time period between timings T09 and T10 and a time period between T19 and T20, respectively. The light in the red wavelength range emitted from the red light source 121 is emitted to the light source-side optical system 170 without being converted to light of a different other wavelength as shown in the optical path shown in FIG. 3.

On the other hand, light in the blue wavelength range emitted from the blue laser diodes 71 is kept emitted in a constant outputting state in anyone of the time periods. The light in the blue wavelength range is shone on to anyone of the transmitting segment 310, the green luminescent material body 321 and the red luminescent material body 322 of the luminescent wheel 101 shown in FIG. 4. The light in the blue wavelength range is shone on to a boundary Bb between the red luminescent material body 322 and the transmitting segment 310 which are shown in FIG. 4 near the timing T1*b*, is shone on to a boundary Bg between the transmitting segment 310 and the green luminescent material body 321 near a timing T1*g*, and is shone on to a boundary Br between the green luminescent material body 321 and the red luminescent material body 322 near a timing T1*r*.

The light in the blue wavelength range from the excitation light shining device 70 is shone on to both the red luminescent material body 322 and the transmitting segment 310, which lie adjacent to each other, at the boundary Bb on the luminescent wheel 101 during the time period between the timings T09 and T10 (a second color mixing period). Then, light in the red wavelength range L2 is emitted from the red luminescent material body 322, and the light in the red wavelength range L2 is reflected by the first dichroic mirror 141 and then reaches the second dichroic mirror 148. Additionally, the light in the blue wavelength range or a blue wavelength range L3 is emitted from the transmitting segment 310 and reaches the second dichroic mirror 148 by way of the first reflecting mirror 143 and the second reflecting mirror 145. Consequently, light in a wavelength range of magenta is emitted from the second dichroic mirror 148 to be combined with the light in the red wavelength range L1 which is emitted from the red light source 121. Due to this, as emitted light 510 from the light source unit 60, light in the magenta wavelength range (M) is emitted during the time period between the timings T09 and T10. The intensity of the light in the blue wavelength range which is emitted during the time period up to the timing T10 and is partially shone on to the red luminescent material body 322 is set lower than the intensity of light emitted during a time period from the timing T10 to a timing T17, which will be described later, because the conversion efficiency of the red luminescent material body 322 is low in general.

The light in the blue wavelength range is shone on to the transmitting segment 310 of the luminescent wheel 101 during a time period between the timings T10 to T13 (a first segment period), and no light in the red wavelength range is emitted from the red light source 121. Due to this, the light source unit 60 emits the light in the blue wavelength range (B) as the emitted light 510 thereof.

The light in the blue wavelength is shone on to both the transmitting segment 310 and the green luminescent material body 321, which lie adjacent to each other, at the boundary Bg of the luminescent wheel 101 during the time period T13 and T14 (a third color mixing period). Due to this, the light in the blue wavelength range which passes through the transmitting segment 310 is emitted to the second dichroic mirror 148 shown in FIG. 3, and light in the green wavelength range emitted from the green luminescent material body 321 is reflected by the first dichroic mirror 141 to reach the second dichroic mirror 148. The light in the blue wavelength range and the light in the green wavelength range are combined with the light in the red wavelength range L1 emitted from the red light source 121 at the second dichroic mirror 148. Due to this, light in a wavelength range of white (W) is emitted as the emitted light 510 of the light source unit 60 during the time period between the timings T13 and T14.

The light in the blue wavelength range is shone on to the green luminescent material body 321, and no light in the red wavelength range is emitted from the red light source 121 during a time period between the timings T14 to T17 (a second segment period). Due to this, the light source unit 60 emits the light in the green wavelength range (G) as the emitted light 510 thereof.

The light in the blue wavelength range is shone on to both the green luminescent material body 321 and the red luminescent material body 322, which lie adjacent to each other, at the boundary Br of the luminescent wheel 101 during a time period (a first color mixing period) between the timing T17 and a timing T18. Due to this, both the light in the green wavelength range and the light in the red wavelength range are reflected by the first dichroic mirror 141 to be combined together, and the resulting combined light is emitted as light in a wavelength range of yellow. Additionally, the light in the yellow wavelength range is combined with the light in the red wavelength range L1 emitted by the red light source 121. Due to this, the light in the yellow wavelength range (Y) is emitted as the emitted light 510 of the light source unit 60 during the time period between the timings T17 and T18. The intensity of the light in the blue wavelength range which is emitted during the time period between the timings T17 and T18 is set lower than the intensity of the light in the blue wavelength range which is emitted during the time period between the timings T10 to T17.

The light in the blue wavelength range is shone on to the red luminescent material body 322 of the luminescent wheel 101 during a time period between the timings T18 and T19 (a third segment period). Due to this, the light in the red wavelength range L2 is shone on to the first dichroic mirror 141. The light in the red wavelength range L2 is combined with the light in the red wavelength range L1 emitted from the red light source 121 at the first dichroic mirror 141. Due to this, the light in the red wavelength range (R) is emitted as the emitted light 510 of the light source unit 60 during the time period between the timings T18 and T19. As with the time period between the timings T17 and T18, the intensity of the light in the blue wavelength range emitted during the time period between the timings T18 and 119 is set lower than the intensity of the light in the blue wavelength range emitted during the time period between the timings T10 to T17.

As with the time period between the timings T09 and T10, the light in the blue wavelength range is shone on to both the red luminescent material body 322 and the transmitting segment 310, which are adjacent to each other, at the boundary Bb of the luminescent wheel 101 during the time period between the timings T19 and T20 (the second color mixing period). Due to this, light in the magenta wavelength range is emitted to the second dichroic mirror 148 shown in FIG. 3 and is then combined with the light in the red wavelength range L1 emitted by the red light source 121. Due to this, the light in the magenta wavelength range (M) is emitted as the emitted light 510 of the light source unit 60 during the time period between the timings T19 and T20. The intensity of the light in the blue wavelength emitted during the time period between the timings T18 and T19 is set lower as in the case with the time period between the timings T17 to T19.

Thus, the light source unit 60 can emit the blue, green, red, magenta, white and yellow light as the emitted light 510 in a time sharing fashion in the single unit period TU of the timings Tb1 and Tb2. By controlling the light source unit 60 in the way described above, a turn-off period of the light source unit 60 in the unit period TU can be reduced, whereby the projector 10 can project a highly bright image on to a screen or the like. In addition, By including the red luminescent material body 322 and the red light source 121, the light in the red wavelength range whose luminosity factor is low can be made bright.

The light source unit 60 can emit light in a wavelength range of cyan as the emitted light 510 thereof by controlling so that no light in the red wavelength range is emitted from the red light source 121.

The red light source 121 may be controlled so as be off to stop emitting light in the red wavelength range at timings T11, T15, T21 which occur later than the aforesaid timings T10, T14, T20, respectively. By doing so, light in the magenta wavelength range (M) can be emitted during the time periods between the timings T10 and T11 and between the timings T20 and T21, and light in the yellow wavelength range (Y) can be emitted during the time period between the timings T14 and T15. The light source unit 60 can extend the periods of time during which light in the magenta wavelength range and light in the yellow wavelength range are emitted.

Further, the red light source 121 may be controlled to be on at timings T12 and T16 which occur earlier than the aforesaid timings T13 and T17, respectively. By doing so, the time period during which light in the magenta wavelength range (M) is emitted can be extended during the time period between the timings T12 and T13, and the time period during which light in the yellow wavelength range is emitted can be extended during the time period between the timings T16 and T17.

Thus, as has been described heretofore, the light intensity control to change the brightness of light emitted from the light source unit 60 can be executed flexibly by making changeable the color mixing periods (the time period between the timings T09 and T10, the time period between the timings T13 and T14, the time period between the timings T17 and T18, and the time period between the timings T19 and T20) where a plurality of rays of light of different color systems are outputted during the same time period.

Next, the color prioritizing mode will be described. A waveform W3 indicates an output of the red light source 121 in the color prioritizing mode. In addition, a waveform W4 indicates an output state of the blue laser diodes 71 in the color prioritizing mode.

In the color prioritizing mode, the red light source 121 emits light in the red wavelength range during the time period between the timings T18 and T19 in the unit period TU.

On the other hand, the blue laser diodes 71 emit light in the blue wavelength range during the time period between the timings T10 to T13 and the time period between the timings T14 to T17. Since the light in the blue wavelength range so emitted is shone on to anyone of the transmitting segment 310, the green luminescent material body 321 and the red luminescent material body 322 of the luminescent wheel 101, the light source unit 60 can change the color of light emitted as the emitted light 520 thereof. The intensity of light in the blue wavelength range emitted from laser diodes 71 in the color prioritizing mode is set less intense than the intensity of light in the blue wavelength range emitted from the blue laser diodes 71 in the brightness prioritizing mode. The intensity of light in the blue wavelength range emitted from the blue laser diodes 71 in the color prioritizing mode can be less intense than, equal to or more intense than when emitting other light in the green wavelength range and light in the red wavelength range due to color balance or the like.

Light in the blue wavelength range is shone on to the transmitting segment 310 of the luminescent wheel 101 and no light in the red wavelength range is emitted from the red light source 121 during the time period between the timings T10 to T13. Due to this, the light source unit 60 emits light in the blue wavelength range (B) as the emitted light 520 thereof. Light in the blue wavelength range is not emitted during the time period between the timings T13 and T14.

Light in the blue wavelength range is shone on to the green luminescent material body 321 during the time period between the timings T14 to T17 and no light in the red wavelength range is emitted from the red light source 121. Due to this, the light source unit 60 emits light in the green wavelength range (G) as the emitted light 520 thereof. No light in the blue wavelength range is shone on to the boundary Br of the luminescent wheel 101 during the time period between the timings T17 and T18.

No light in the blue wavelength range is emitted during the time period between the timings T18 and T19. Consequently, light in the red wavelength range (R) is emitted as the emitted light 520 of the light source unit 60 during the time period between the timings T18 and T19. Additionally, no light in the blue wavelength range is shone on to the boundary Bb of the luminescent wheel 101 during a time period between the timings T19 to T20.

Light in the blue wavelength range can be emitted during the time period between the timings T18 and T19. As this occurs, the intensity of the light in the blue wavelength range so emitted may be set less intense than the light in the blue wavelength range emitted during the time period between the timings T14 to T17.

Thus, since the light source unit 60 in the color prioritizing mode makes use of the light emitted from the red right source 121 as the emitted light 520 which is red, it is possible to project an image which is high in color reproducibility and color purity on to a screen.

Thus, with the light source unit 60 of the first embodiment, an overall light intensity controlling range can be improved by enhancing the maximum luminance of light in the red wavelength range. Additionally, the color purity and color balance of light in the red wavelength range can easily be controlled by changing relatively the intensity of light in the red wavelength range on the shorter wavelength side or light in the red wavelength range on the longer wavelength side of the red wavelength range. Brightness and color balance can easily be controlled by executing the switching between the brightness prioritizing mode and the color prioritizing mode. In addition, since no new optical member has to be provided separately as a light source of light in the red wavelength range, it is possible to prevent the enlargement in size of the light source unit 60 as a whole.

(Second Embodiment)

Figure 7:
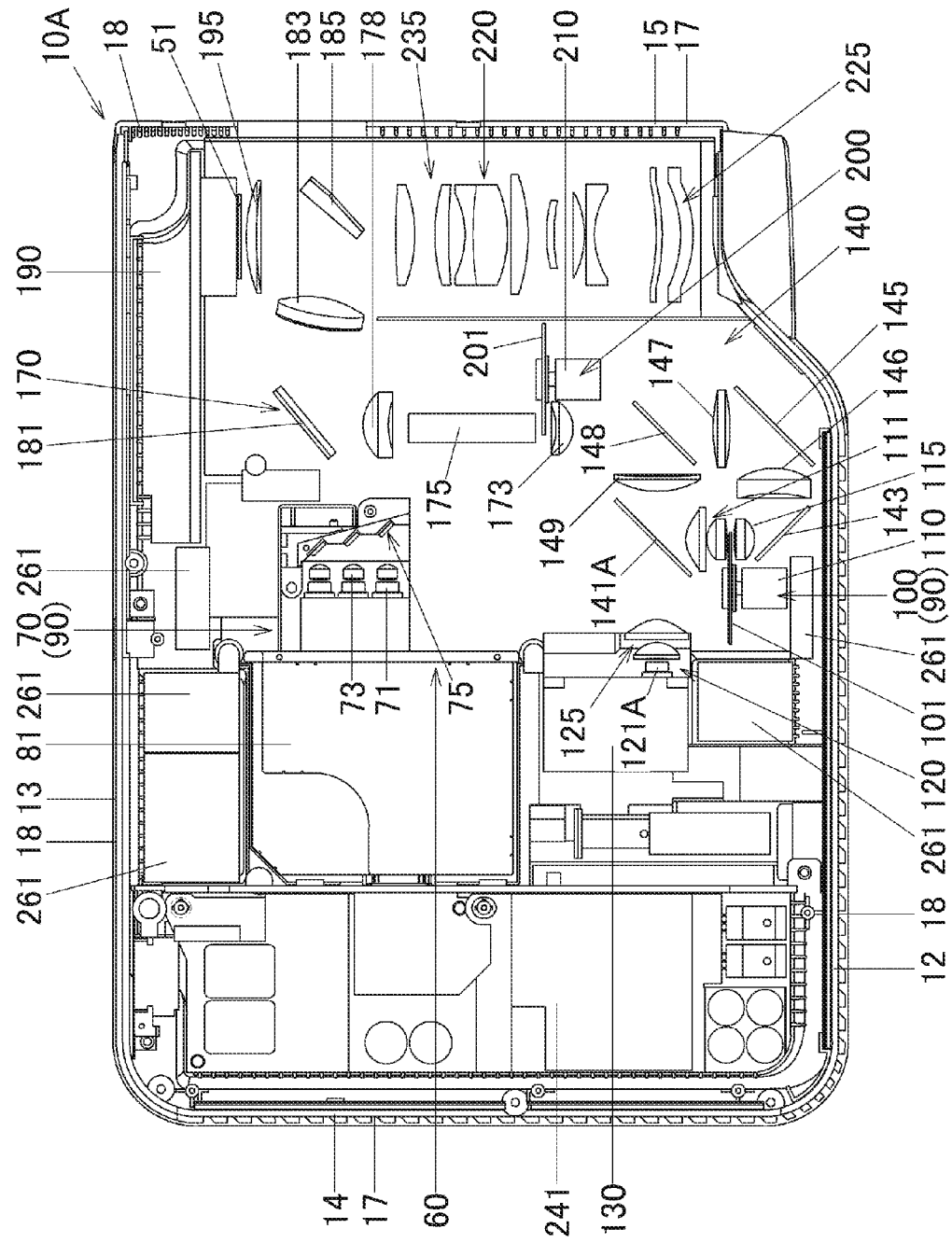
FIG. 7 is a schematic plan view showing an internal construction of a projector according to a second embodiment of the invention.

Next, a second embodiment will be described. FIG. 7 is a schematic plan view showing an internal construction of a projector 10A of the second embodiment. The projector 10A of this embodiment includes a red light source 121A which is a laser diode in place of the red light source 121 described as the light emitting diode in the first embodiment and a first dichroic mirror 141A having different transmission and reflection properties in place of the first dichroic mirror 141. Further, the projector 10A includes a color wheel device 200. In the following description, like reference numerals will be given to like configurations to those of the first embodiment, and the description thereof will be omitted or simplified.

Figure 8:
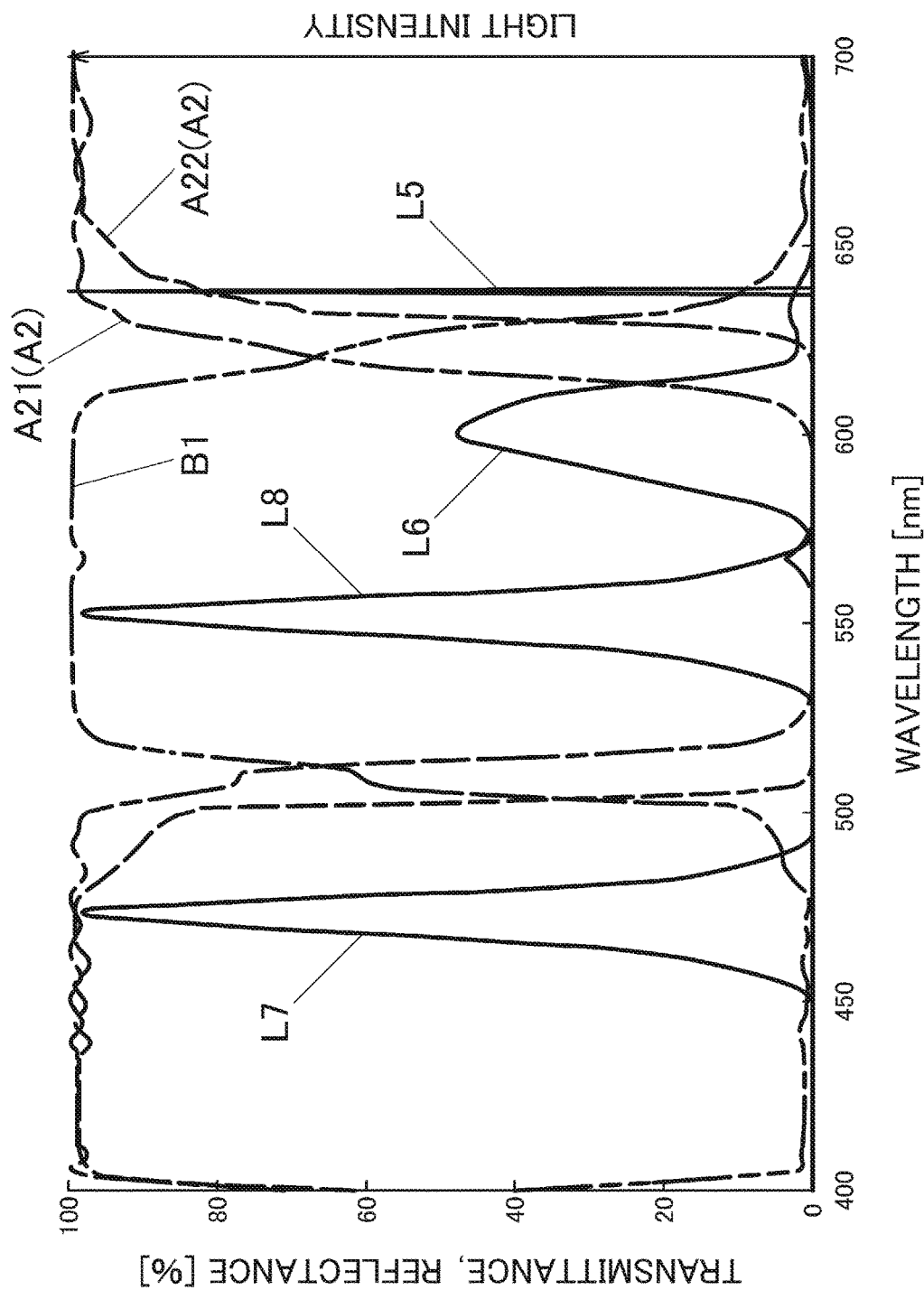
FIG. 8 is spectral distribution chart of a first dichroic mirror according to the second embodiment of the invention.

FIG. 8 is a spectral distribution chart of the first dichroic mirror 141A. A first axis of ordinate on the left denotes transmittance [%] and reflectance [%], and a second axis of ordinate on the right denotes light intensity. An axis of abscissa denotes a wavelength [nm] of light. Shown in FIG. 8 are a distribution curve of light in a red wavelength range L5 which is emitted from the red light source 121A and a distribution curve of light in a red wavelength range L6 which is emitted from a red luminescent material body 322, a transmission property A2 of the first dichroic mirror 141A, and a reflection property B1 of the first dichroic mirror 141A. The transmission property A2 of the first dichroic mirror 141A is shown as being divided into a transmission property A21 for p-polarized light shown by an alternate short and long dash line and a transmission property A22 for s-polarized light shown by a broken line. The reflection property B1 in FIG. 8 is shown as an average of reflection properties of the p-polarized light and the s-polarized light.

The light in the red wavelength range L5 of this embodiment is light whose wavelength range is not longer than 10 nm and whose peak wavelength is about 640 nm. The light in the red wavelength range L6 is light whose wavelength range is in the range of about 570 nm to about 630 nm and whose peak wavelength is about 600 nm. Thus, the wavelength of the light in the red wavelength range L5 is longer than the wavelength of the light in the red wavelength range L6. Additionally, the intensity of the light in the red wavelength range L5 is more intense than the intensity of the light in the red wavelength range L6. The light in the red wavelength range L5 has a half width which is narrower than the light in the red wavelength range L1 shown in the first embodiment.

As shown in the transmission property A21, the first dichroic mirror 141A transmits light having a wavelength range of about 400 nm to about 510 nm and reflects light having a wavelength range of about 510 nm to about 620 nm for the p-polarized light. Additionally, the first dichroic mirror 141A transmits a portion of the p-polarized light whose wavelength range of not shorter than about 620 nm. As shown in the transmission property A22, the first dichroic mirror 141A transmits light having a wavelength range of about 400 nm to about 500 nm and reflects light having a wavelength range of about 500 nm to about 630 nm for the s-polarized light. Additionally, the first dichroic mirror 141A transmits a portion of the s-polarized light whose wavelength range of not shorter than about 630 nm. Thus, the first dichroic mirror 141A has a wider transmission wavelength range for the p-polarized light than for the s-polarized light. Which of the transmission properties A21 and A22 is made use of can be determined in advance according to the wavelength and polarization property of light which is caused to be incident on the first dichroic mirror 141A.

In the second embodiment, light in the red wavelength range emitted from the red light source 121A will be described as light being incident on the first dichroic mirror 141A as p-polarized light. The first dichroic mirror 141A transmits light in a blue wavelength range whose wavelength range of about 450 nm to about 490 nm and whose peak wavelength is about 470 nm and the light in the red wavelength range L5 emitted from the red light source 121A and reflects light in a green wavelength range whose wavelength range is about 530 nm to about 570 nm and whose peak wavelength is about 550 nm and the light in the red wavelength range L6 emitted from the red luminescent material body 322.

In this embodiment, the light in the red wavelength range L5 is incident as p-polarized light, and the transmissivity of the transmission property A21 near about 640 nm which is the wavelength of the light in the red wavelength range L5 is substantially 100%. Consequently, the first dichroic mirror 141A transmits most of the light in the red wavelength range L5. Additionally, the transmissivity of the transmission property A21 is substantially 0% and the reflectance factor of the reflection property B1 is substantially 100% near 600 nm which is the wavelength of the light in the red wavelength L6. Consequently, the first dichroic mirror 141A reflects most of the light in the red wavelength range L6.

The color wheel device 200 includes a color wheel 201 and a motor 210 which drives the color wheel 201 rotationally. The color wheel device 200 is disposed so that the color wheel 201 is disposed between a collective lens 173 and a light tunnel 175 in such a way as to be parallel to an axis of a pencil of light emitted from the collective lens 173 at right angles.

Figure 9A:
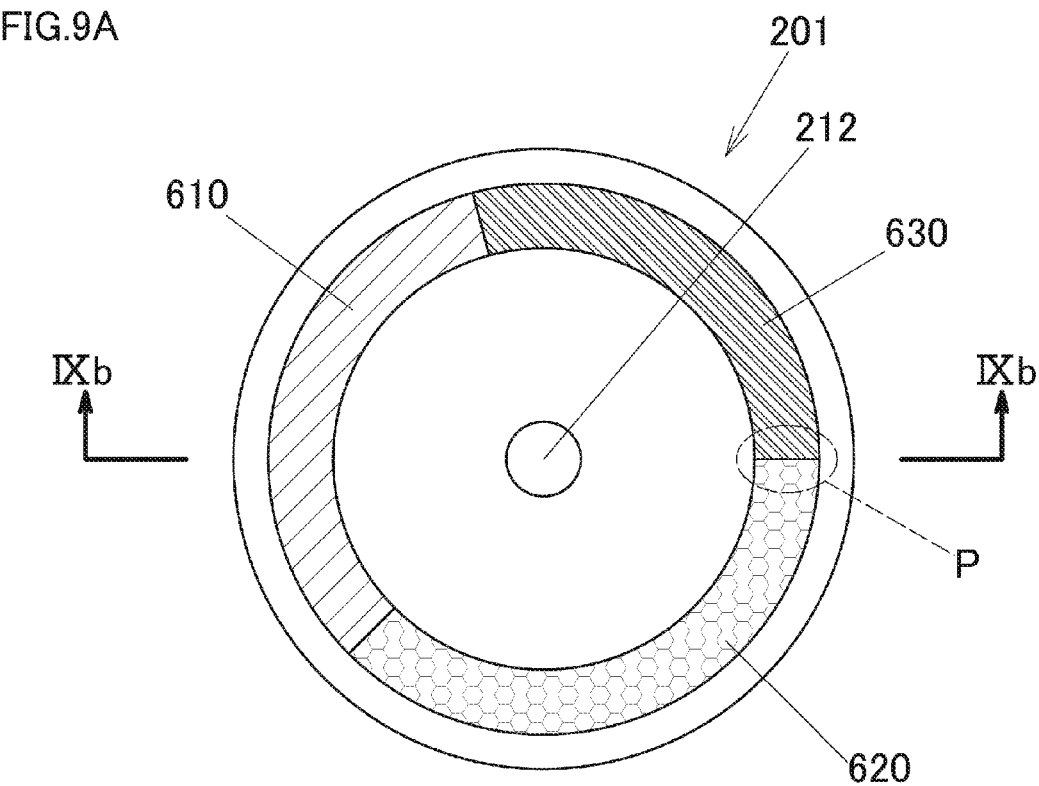
FIG. 9A is a schematic front view of a color wheel according to the second embodiment of the invention.

FIG. 9A is a schematic front view of the color wheel 201. The color wheel 201 has the shape of a substantially circular disc and is fixed rotatably at a center portion thereof by a rotational shaft 212 of the motor 210. The color wheel 201 has a blue segment (a first dichroic filter) 610, a green segment (a second dichroic filter) 620 and a red segment (a third dichroic filter) 630 which are disposed end to end in a circumferential direction. The blue segment 610, the green segment 620 and the red segment 630 function as dichroic filters which transmit light in a blue wavelength range, light in a green wavelength range and light in a red wavelength range, respectively.

Figure 9B:
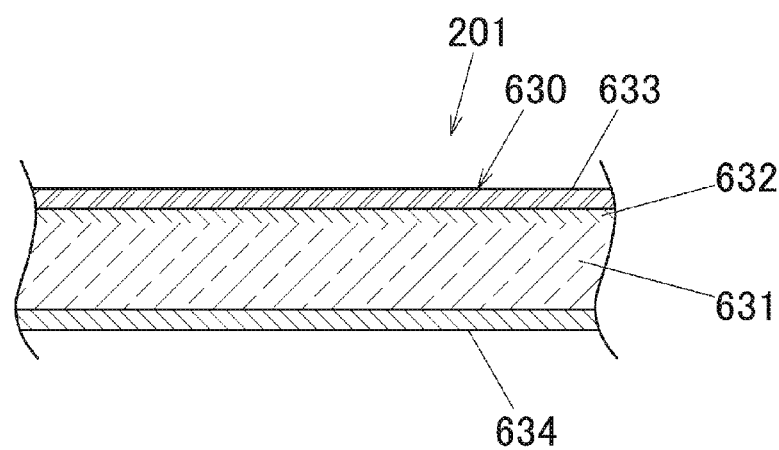
FIG. 9B is an enlarged sectional view of a portion P of the color wheel according to the second embodiment of the invention taken along a line IXb-IXb shown in FIG. 9A.

FIG. 9B is an enlarged sectional view of a portion P of the color wheel 201 shown in FIG. 9A taken along a line IXb-IXb shown therein. FIG. 9B shows a section of a portion of the red segment 630. The red segment 630 is formed by applying a surface treatment on each side of a base material 631 having a light transmitting property. A diffusing layer 632 is formed on a surface of the base material 631 on which light in the red wavelength range is incident, and minute irregularities are provided on the diffusing layer 632. By adopting this configuration, light which passes through the diffusing layer 632 is diffused at a predetermined angle. Further, an AR coat (Anti-Reflection Coat) 633 is formed on a surface of the diffusing layer 632. Additionally, a dichroic coat 634, which transmits light in the red wavelength range, is formed on a surface of the base material 631 from which light in the red wavelength range emerges.

As with the dichroic coat 634 of the red segment 630, dichroic coats, which transmit light in the blue wavelength range and light in the green wavelength range, are formed on emerging surface sides of the blue segment 610 and the green segment 620, respectively. Further, as with the AR coat 633 and the diffusing layer 632 of the red segment 630, An AR coat and a diffusing layer can be formed on an incident surface side of each of the blue segment 610 and the green segment 620. As this occurs, a configuration can be adopted in which no diffusing function is given to a transmitting segment 310 of a luminescent wheel 101.

A pencil of light which is incident on the color wheel 201 passes through anyone of the segments 610 to 630 which are provided on the color wheel 201, whereby a component in a predetermined wavelength range is cut off, and the remaining components of the pencil of light are emitted towards the light tunnel 175. Thereafter, the resulting pencil of light which is incident on the light tunnel 175 is converted to a pencil of light whose intensity is uniformly distributed by the light tunnel 175.

As shown in the timing chart which is described by reference to FIG. 6, the light source 60 of this embodiment is controlled either in a brightness prioritizing mode or a color prioritizing mode. In this case, in FIG. 6, the red light source 121A is used in place of the red light source 121.

Additionally, the rotation of the color wheel 201 is controlled in synchronism with the rotation of the luminescent wheel 101. Namely, the color wheel 201 is controlled so that when a shining position 410 of the luminescent wheel 101 is situated on the transmitting segment 310, the blue segment 610 of the color wheel 201 is situated on an optical path of light which is incident thereon, when the shining position 410 of the luminescent wheel 101 is situated on a green luminescent material body 321, the green segment 620 of the color wheel 201 is situated on the optical path, and when the shining position 410 of the luminescent wheel 101 is situated on a red luminescent material body 322, the red segment 630 of the color wheel 201 is situated on the optical path.

Thus, the light source unit 60 can emit light after its intensity is controlled by removing light in an unnecessary wavelength range as emitted light 510 and emitted light 520.

Thus, as has been described heretofore, the light source unit 60 of this embodiment uses the red light source 121A having the narrow half width. Due to this, the light in the red wavelength range L5 emitted by the red light source 121A and the light in the red wavelength range L6 emitted from the red luminescent material body 322 do not overlap over a wide wavelength range, and hence, their optical paths can easily be controlled separately. Consequently, since the light of the same color system and in the different wavelength ranges combined from the plurality of paths, the light source unit 60 can emit light in the red wavelength range having high luminance brightness.

In the second embodiment, the color wheel 201 is provided for color correction, and the diffusing layer 632 is provided on the red segment 630. By adopting this configuration, the light in the red wavelength range emitted from the red light source 121A is diffused, and a variation in luminance distribution and speckle noise can be reduced.

Next, a modified example of the first embodiment and the second embodiment will be described. The light source group made up of the plurality of blue laser diodes 71 is disposed on the plane which is formed vertically in FIG. 3. The light emitting pattern of the blue laser diodes 71 is changed to control the intensity of light emitted therefrom so that the luminance distribution becomes uniform.

For example, the light source unit 60 can emit light in the red wavelength range by illuminating only the red light source 121 which is the light emitting diode or the red light source 121A which is the laser diode and light in the red wavelength range by exciting the red luminescent material body 322 during the time period between the timings T18 and T19 in the color prioritizing mode shown in FIG. 6. As this occurs, in the light source unit 60, in the plurality of laser diodes 71 which are arranged into the planar configuration, the value of an electric current supplied to the blue laser diodes 71 which are disposed on the periphery of the blue laser diodes 71 which are disposed centrally is reduced to a lower level than that of an electric current supplied to the centrally disposed blue laser diodes 71 so as to make the intensity of light emitted from the peripheral blue laser diodes 71 less intense. Alternatively, in the light source unit 60, in the blue laser diodes 71 which are arranged into the planar configuration, the blue laser diodes 71 which are disposed on the periphery of the blue laser diodes 71 which are disposed centrally can be turned off.

On the contrary to what has been described above, in the light source unit 60, in the plurality of blue laser diodes 71 which are arranged into the planar configuration, the value of the electric current supplied to the blue laser diodes 71 which are disposed centrally is reduced to a lower level than that of the electric current supplied to the blue laser diodes 71 which are disposed on the periphery of the blue laser diodes 71 which are disposed centrally so as to make the intensity of light emitted from the central blue laser diodes 71 less intense. Alternatively, in the plurality of blue laser diodes 71, the value of the electric current supplied to the centrally disposed blue laser diodes 71 may be increased, as required, to a higher level than that of the electric current supplied to the peripherally disposed blue laser diodes 71 so as to make the intensity of light emitted from the central blue laser diodes 71 more intense.

In addition, in the case where in the light source unit 60, the red light source 121 of the red light source device 120 is made up of a plurality of light emitting diodes which are arranged into a planar configuration or in the case where the red light source 121A is made up of a plurality of laser diodes which are arranged into a planar configuration, the light source unit 60 can make a luminance distribution of light in the red wavelength range emitted from the red light source 121, 121A uniform by supplying an electric current of the same value to all the light emitting diodes of the red light source 121 or all the laser diodes of the red light source 121A.

Figure 10:
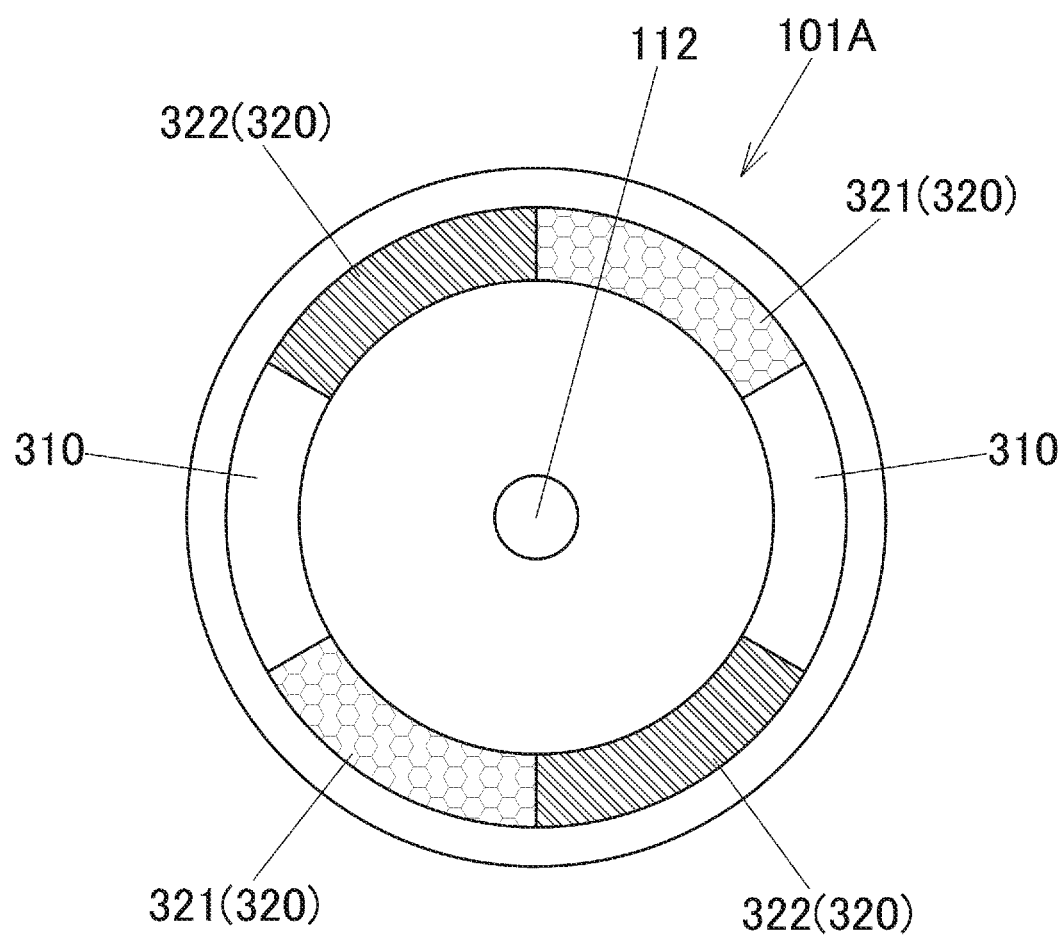
FIG. 10 is a front view of a luminescent wheel showing a modified example made to the luminescent wheels of the embodiments of the invention.

Next, a modified example of the luminescent wheel 101 will be described. FIG. 10 shows a luminescent wheel 101A. The light source unit 60 of the first embodiment can include the luminescent wheel 101A in place of the luminescent wheel 101 shown in FIG. 3. The luminescent wheel 101A has two transmitting segments 310, two green luminescent material bodies 321 and two red luminescent material bodies 322 which are disposed alternately end to end in a circumferential direction. The transmitting segments 310, the green luminescent material bodies 321 and the red luminescent material bodies 322 are disposed substantially at the same angle about a shaft hole portion 112 in the circumferential direction.

In this case, the length of the unit period TU shown in FIG. 6 becomes about a half thereof. The control module 38 controls so that the emitted light 510, 520 can be emitted to form an image frame in a single unit period TU which is now a half of the unit period TU shown in FIG. 6. Consequently, the projector 10 can increase the frame rate by switching to display image frames at a double speed. This allows the projector 10 to project a smoother picture onto a screen.

The arc-shaped transmitting segments 310, green luminescent material bodies 321 and red luminescent material bodies 322 may each extend circumferentially at an angle which corresponds to a half of the angle at which the transmitting segment 310, the green luminescent material body 321 and the red luminescent material body 322 extend circumferentially in FIG. 4.

The luminescent wheel 101A can be provided on the light source unit 60 of the second embodiment. As this occurs, two blue segments 610, two green segments 620 and two red segments 630 are provided on the color wheel 201 so as to correspond to the two transmitting segments 310, the two green luminescent material bodies 321 and the two red luminescent material bodies 322 on the luminescent wheel 101A. Thus, light in the blue wavelength range which passes through the transmitting segments 310 is incident on the blue segments 610, light in the green wavelength range emitted from the green luminescent material bodies 321 incident on the green segments 620, and light in the red wavelength range emitted from the red luminescent material bodies 322 is incident on the red segments 630.

The luminescent wheel 101 shown in the first embodiment and the second embodiment has the green luminescent material body 321 zone and the red luminescent material body 322 zone, whereby the excitation light shining segment on the luminescent wheel 101 becomes long to thereby bring about a case where the heat value of the luminescent material body zones is increased from time to time. However, the heat dissipating performance can be enhanced by dispersing the heat generating portions in the luminescent wheel 101A in the way described above.

While the green luminescent material body 321 is used as the light source of light in the green wavelength range in each of the first and second embodiments, a light emitting diode, a laser diode or other light source which emit light in the green wavelength range can be used as the green light source.

In FIG. 6, while either the red light source 121 or the blue laser diodes 71 are described as emitting light during the unit period TU, in the light source unit 60, the time periods during which light is emitted can be reduced separately according to settings of brightness and color balance.

Thus, as has been described heretofore, the light source unit 60 and the projector 10 of the embodiments of the invention have the first light source (the blue laser diodes 71) which emits light in the first wavelength range and the luminescent wheel device which includes the luminescent wheel 101. The luminescent wheel 101 includes the second light source (the green luminescent material body 321) which emits light in the second wavelength range which is luminous light excited by the light in the first wavelength range and the third light source (the red luminescent material body 322) which emits light in the third wavelength range which is luminous light excited by the light in the first wavelength range and which has the different wavelength from that of the light in the second wavelength range, the second light source and the third light source being disposed end to end and adjacent to each other in the circumferential direction. In the light source unit 60 and the projector 10, the first light source is controlled to be off or on during the first color mixing period during which the boundary between the second light source and the third light source is situated on the optical path of the light in the first wavelength range. Thus, it is possible to provide the light source unit 60 and the projector 10 in which the extent of light intensity control for brightness or color balance is expanded in the way described above.

Additionally, in the light source unit 60 where the transmitting segment 310 which transmits the light in the first wavelength range is provided on the luminescent wheel 101 so as to be disposed end to end and adjacent to the second light source and the third light source in the circumferential direction, and the first light source is controlled to be off or on during the second color mixing period during which the boundary between the third light source and the transmitting segment is situated on the optical path of the light in the first wavelength range or the third color mixing period during which the boundary between the transmitting segment and the second light source is situated on the optical path of the light in the first wavelength range, the light in the first wavelength range, the light in the second wavelength range and the light in the third wavelength range, which have the different colors, can be emitted from the luminescent wheel 101 by illuminating the first light source singly.

The light source unit 60 includes further the fourth light source which emits light in the fourth wavelength range which is of the same color system of the light in the third wavelength range and which has the different wavelength therefrom, and the control module controls the fourth light source to be off or on during the first color mixing period, the second color mixing period and the third color mixing period. Thus, since the light source unit 60 uses the plurality of types of light sources whose luminosity factors are relatively low and can extend the color mixing periods, the light source unit 60 can emit light whose intensity can be controlled widely and which is bright as a whole of the light source.

In the light source unit 60 where the light in the first wavelength range is emitted during the first segment period, the light in the second wavelength range is emitted during the second segment period, and the light in the third wavelength range is emitted during the third segment period, the light in the first wavelength range, the light in the second wavelength range and the light in the third wavelength range which are emitted through time sharing can be combined together so as to emit light source light for forming a color image.

Additionally, in the case of the brightness prioritizing mode, in the light source unit 60 where the light in the first wavelength range and the light in the second wavelength range are emitted at the same time during the third color mixing period, the light in the second wavelength range, the light in the third wavelength range and the light in the fourth wavelength range are emitted at the same time during the first color mixing period, and the light in the third wavelength range, the light in the fourth wavelength range and the light in the first wavelength range are emitted at the same time during the second color mixing period, since the time period during which emitted light is turned off during the unit period TU can be reduced, a highly bright image can be projected.

In the light source unit 60 where the light in the first wavelength range is shone on to the boundary between the second light source and the third light source during the first color mixing period, the light in the first wavelength range is shone on to the boundary between the third light source and the transmitting segment 310, and the light in the first wavelength range is shone on to the boundary between the transmitting segment and the second light source, the light resulting from combining rays of light of different wavelengths emitted during the first color combining period to the third color combining period can be emitted as light source light.

Additionally, in the brightness prioritizing mode, in the light source unit 60 where the light in the fourth wavelength range is emitted further during the third color mixing period, the light in the white wavelength range can be emitted during the unit period TU. Consequently, the highly bright image can be projected onto a screen or the like without having to represent the white light by the three primary colors which are projected in a time sharing fashion.

In the case of the color prioritizing mode, in the light source unit 60 where the first light source is turned off during the first color mixing period, the second color mixing period and the third color mixing period, since the light source unit 60 does not emit light in which the colors are mixed, the light source light having high color purity can be emitted.

In the light source unit 60 where the two transmitting segments 310, the two second light sources and the two third light sources are disposed on the luminescent wheel, since the heat generating portions are dispersed in the luminescent wheel 101A, the heat dissipating performance of the luminescent wheel 101A can be enhanced.

In the light source unit 60 which includes the color wheel 201 where the first dichroic filter which transmits the light in the first wavelength range, the second dichroic filter which transmits the light in the second wavelength range and the third dichroic filter which transmits the light in the third wavelength range and the light in the fourth wavelength range are disposed end to end in the circumferential direction, the light in the red wavelength range which is emitted from the red light source 121A, which is the laser diode, is diffused to thereby reduce the variation in luminance distribution and the speckle noise.

In the light source unit 60 where the light in the first wavelength range is light in the blue wavelength range, the light in the second wavelength range is light in the green wavelength range, and the light in the third wavelength range and the light in the fourth wavelength range are light in the red wavelength ranges, the color image made up of the three primary colors can be projected on to the screen.

In the light source unit 60 where the fourth light source is the light emitting diode and the wavelength of the light in the third wavelength range is shorter than the wavelength of the fourth wavelength range, the image whose luminance distribution is more uniform can be projected by using the light in the red wavelength range whose luminance irregularity is small.

In the light source unit 60 where the fourth light source is the laser diode and the wavelength of the light in the third wavelength range is shorter than the wavelength of the fourth wavelength range, the highly bright image as a whole can be projected on the screen by using the light in the red wavelength range which is highly bright.

In the light source unit 60 which includes the first dichroic mirror 141, 141A which transmits the light in the fourth wavelength range and reflects the light in the third wavelength range to combine the light in the fourth wavelength range and the light in the third wavelength range together into the same optical path, the plurality of rays of light which are of the same color system and which have the different wavelengths can be combined together for emission of the light source light.

In the embodiments that have been described heretofore, while the red light source (R-LED) 121 is taken for the example, a green light source (G-LED) may be used in place of the red light source.

These embodiments are presented as the examples and are not intended at all to limit the scope of the invention. The novel embodiments can be carried out in other various forms, and hence, various omissions, replacements and modifications can be made thereto without departing from the spirit and scope of the invention. The resulting embodiments and their modifications are included in the spirit and scope of the invention and are also included in the scope of inventions claimed for patent in claims and their equivalents.

What is claimed is:

1. A light source unit comprising:
   a first light source for emitting light in a first wavelength range;
   a luminescent wheel device comprising a luminescent wheel including (i) a second light source for emitting light in a second wavelength range which is luminous light excited by the light in the first wavelength range, and (ii) a third light source for emitting light in a third wavelength range which is luminous light excited by the light in the first wavelength range and whose wavelength differs from a wavelength of the light in the second wavelength range, the second light source and the third light source being disposed end to end in an adjacent fashion in a circumferential direction;
   a fourth light source for emitting light in a fourth wavelength range which is of the same color system as the light in the second wavelength range or which is of the same color system as the light in the third wavelength range; and
   a control unit for controlling the fourth light source and the luminescent wheel device so that the fourth light source is illuminated during a first color mixing period during which a boundary between the second light source and the third light source is situated on an optical path of the light in the first wavelength range,
   wherein a transmitting segment which transmits the light in the first wavelength range is provided end to end with the second light source and the third light source in an adjacent fashion on the luminescent wheel, and
   wherein the control unit performs control so that the fourth light source is illuminated during a second color mixing period during which a boundary between the third light source and the transmitting segment is situated on the optical path of the light in the first wavelength range or a third color mixing period during which a boundary between the transmitting segment and the second light source is situated on the optical path of the light in the first wavelength range.

2. The light source unit according to claim 1, wherein the control unit performs control so that the first light source is illuminated during the first color mixing period, the second color mixing period, and the third color mixing period.

3. The light source unit according to claim 2, wherein in a first segment period, a second segment period, and a third segment period which are repeated in a time sharing fashion, the control unit performs control to emit the light in the first wavelength range during the first segment period, to emit the light in the second wavelength range during the second segment period, and to emit the light in the third wavelength range during the third segment period.

4. The light source unit according to claim 3, wherein in a case of a brightness prioritizing mode, the control unit performs control to:
   emit the light in the first wavelength range and the light in the second wavelength range at the same time during the third color mixing period which occurs between the first segment period and the second segment period,
   emit the light in the second wavelength range, the light in the third wavelength range, and the light in the fourth wavelength range at the same time during the first color mixing period which occurs between the second segment period and the third segment period, and
   emit the light in the third wavelength range, the light in the fourth wavelength range, and the light in the first wavelength range at the same time during the second color mixing period which occurs between the third segment period and the first segment period in the following unit period.

5. The light source unit according to claim 4, wherein the light in the first wavelength range is shone onto the boundary between the second light source and the third light source in the first color mixing period, wherein the light in the first wavelength range is shone onto the boundary between the third light source and the transmitting segment in the second color mixing period, and wherein the light in the first wavelength range is shone onto the boundary between the transmitting segment and the second light source in the third light mixing period.

6. The light source unit according to claim 4, wherein the control unit further performs control to emit the light in the fourth wavelength range during the third color mixing period.

7. The light source unit according to claim 5, wherein the control unit further performs control to emit the light in the fourth wavelength range during the third color mixing period.

8. The light source unit according to claim 3, wherein in a case of a color prioritizing mode, the control unit performs control to turn off the first light source during the first color mixing period, the second color mixing period, and the third color mixing period.

9. The light source unit according to claim 3, wherein in a case of a color prioritizing mode, the control unit performs control to illuminate only the fourth light source or to illuminate the fourth light source and to emit the light in the third wavelength range from the third light source during the third segment period, and wherein an amount of the light in the first wavelength range emitted to the third light source during the third segment period is smaller than amounts of the light in the first wavelength range emitted during the first segment period and the second segment period.

10. The light source unit according to claim 2, wherein two of each of the transmitting segment, the second light source, and the third light source are provided.

11. The light source unit according to claim 3, wherein two of each of the transmitting segment, the second light source, and the third light source are provided.

12. The light source unit according to claim 4, wherein two of each of the transmitting segment, the second light source, and the third light source are provided.

13. The light source unit according to claim 5, wherein two of each of the transmitting segment, the second light source, and the third light source are provided.

14. The light source unit according to claim 2, further comprising:

a color wheel device comprising a color wheel including a first dichroic filter which transmits the light in the first wavelength range, a second dichroic filter which transmits the light in the second wavelength range, and a third dichroic filter which transmits the light in the third wavelength range and the light in the fourth wavelength range, the first dichroic filter, the second dichroic filter, and the third dichroic filter being disposed end to end in a circumferential direction, wherein the control unit further controls the color wheel device.

15. The light source unit according to claim 2, wherein the light in the first wavelength range is light in a blue wavelength range, wherein the light in the second wavelength range is light in a green wavelength range, wherein the light in the third wavelength range is light in a red wavelength range, and wherein the light in the fourth wavelength range is light in a red wavelength range or light in a green wavelength range.

16. The light source unit according to claim 2, wherein the fourth light source is a light emitting diode, and wherein a wavelength of the light in the third wavelength range is shorter than a wavelength of the light in the fourth wavelength range.

17. The light source unit according to claim 2, wherein the fourth light source is a laser diode, and wherein a wavelength of the light in the third wavelength range is shorter than a wavelength of the light in the fourth wavelength range.

18. The light source unit according to claim 2, further comprising:

a first dichroic mirror which transmits the light in the fourth wavelength range and reflects the light in the third wavelength range to thereby combine the light in the fourth wavelength range and the light in the third wavelength range together into the same optical path.

19. A projector comprising: the light source unit according to claim 1; a display device onto which light source light is shone from the light source unit to thereby form image light; and a projection-side optical system for projecting the image light emitted from the display device onto a screen, wherein the control unit further controls the display device and the light source unit.

* * * * *